(12) United States Patent
Kim et al.

(10) Patent No.: US 10,915,621 B2
(45) Date of Patent: *Feb. 9, 2021

(54) KEY GENERATING METHOD AND APPARATUS USING CHARACTERISTIC OF MEMORY

(71) Applicant: SAMSUNG ELECTRONICS CO., LTD., Suwon-si (KR)

(72) Inventors: Seung-Chan Kim, Hwaseong-si (KR); Jungsoon Shin, Yongin-si (KR); Taesung Jung, Seoul (KR); Du-Sik Park, Suwon-si (KR); Joonah Park, Seoul (KR); Soochul Lim, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/747,839

(22) Filed: Jan. 21, 2020

(65) Prior Publication Data

US 2020/0159905 A1 May 21, 2020

Related U.S. Application Data

(63) Continuation of application No. 15/428,677, filed on Feb. 9, 2017, now Pat. No. 10,572,651.

(30) Foreign Application Priority Data

Feb. 16, 2016 (KR) .................. 10-2016-0017671
Sep. 27, 2016 (KR) .................. 10-2016-0124008

(51) Int. Cl.
*G06F 21/44* (2013.01)
*G11C 29/52* (2006.01)
(Continued)

(52) U.S. Cl.
CPC .......... *G06F 21/44* (2013.01); *G06F 11/1048* (2013.01); *G06F 21/575* (2013.01);
(Continued)

(58) Field of Classification Search
CPC .... G06F 21/44; G06F 11/1048; G06F 21/575; G11C 29/52; G11C 29/021;
(Continued)

(56) References Cited

U.S. PATENT DOCUMENTS 6,584,214 B1 6/2003 Pappu et al.
7,913,316 B2 3/2011 Torisaki et al.
(Continued)

FOREIGN PATENT DOCUMENTS

JP 11-45986 A 2/1999
KR 10-1169172 B1 8/2012

OTHER PUBLICATIONS

Daniel E. Holcomb, et al., "Initial SRAM State as a Fingerprint and Source of True Random Numbers for RFID Tags," *Proceedings of the Conference on RFID Security*, vol. 7, 2007 (12 pages, in English).

(Continued)

*Primary Examiner* — Kambiz Zand
*Assistant Examiner* — Benjamin A Kaplan
(74) *Attorney, Agent, or Firm* — NSIP Law

(57) ABSTRACT

A key generating method includes obtaining a first error correcting code (ECC) for original data, obtaining read data from a cell array of a memory comprising the original data, generating a second ECC for the read data, obtaining a location of a cell in which an error occurs from the cell array of the memory in response to the second ECC being different from the first ECC, and generating a key for the memory based on the location of the cell in which the error occurs.

17 Claims, 12 Drawing Sheets

(51) Int. Cl.

| | | |
|---|---|---|
| *G11C 29/42* | (2006.01) | |
| *G11C 29/44* | (2006.01) | |
| *G11C 16/20* | (2006.01) | |
| *G11C 29/02* | (2006.01) | |
| *G06F 21/57* | (2013.01) | |
| *G06F 11/10* | (2006.01) | |

(52) U.S. Cl.
CPC ............ *G11C 16/20* (2013.01); *G11C 29/021* (2013.01); *G11C 29/028* (2013.01); *G11C 29/42* (2013.01); *G11C 29/44* (2013.01); *G11C 29/52* (2013.01); *G11C 2029/4402* (2013.01)

(58) Field of Classification Search
CPC ....... G11C 29/028; G11C 29/42; G11C 29/44; G11C 16/20; G11C 2029/4402
USPC .......................................................... 726/19
See application file for complete search history.

(56) References Cited

U.S. PATENT DOCUMENTS

| | | | |
|---|---|---|---|
| 8,510,608 B2 | 8/2013 | Futa et al. | |
| 8,719,666 B2 | 5/2014 | Marinet | |
| 8,767,445 B2 | 7/2014 | Chellappa et al. | |
| 8,867,739 B2 | 10/2014 | Danger | |
| 8,938,792 B2 | 1/2015 | Koeberl et al. | |
| 9,136,010 B2 | 9/2015 | Kang et al. | |
| 9,402,270 B2* | 7/2016 | Lambert | H04W 76/10 |
| 10,438,684 B2* | 10/2019 | Choi | G11C 29/52 |
| 2008/0158948 A1 | 7/2008 | Sharon et al. | |
| 2014/0089685 A1 | 3/2014 | Suzuki | |
| 2014/0237263 A1 | 8/2014 | Suzuki et al. | |
| 2015/0055417 A1 | 2/2015 | Kim et al. | |
| 2015/0121474 A1 | 4/2015 | Korkishko et al. | |
| 2015/0188717 A1 | 7/2015 | Wu et al. | |
| 2015/0234751 A1 | 8/2015 | Van Der Sluis et al. | |
| 2016/0018998 A1 | 1/2016 | Mohan et al. | |

OTHER PUBLICATIONS

Deepu Roy, et al., "Comb Capacitor Structures for On-Chip Physical Unclonable Function," *IEEE Transactions on Semiconductor Manufacturing*, vol. 22, No. 1, Feb. 2009, pp. 96-102.

Pravin Prabhu, et al., "Extracting Device Fingerprints from Flash Memory by Exploiting Physical Variations," *Proceedings of the International Conference on Trust and Trustowrthy Computing*, Jun. 2011 (17 pages, in English).

Yinglei Wang, et al., "Flash Memory for Ubiquitous Hardware Security Functions: True Random Number Generation and Device Fingerprints," *Proceedings of the IEEE Symposium on Security and Privacy (SP)*, 2012, (15 pages, in English).

Yuan Cao, et al., "CMOS Image Sensor based Physical Unclonable Function for Coherent Sensor-level Authentication," *Proceedings of IEEE Transactions on circuits and Systems I: Regular Papers*, vol. 62, No. 11, 2015, pp. 1-12.

Mitsubishi Electric, Ritsumeikan University, and JST, "Protects the safety and security of embedded devices by using individual differences of LSIs," www.mitsubshielectric.com/news/2015/0205.pdf, Feb. 2015 (3 pages, in English).

* cited by examiner

KEY GENERATING METHOD AND APPARATUS USING CHARACTERISTIC OF MEMORY

CROSS-REFERENCE TO RELATED APPLICATION(S)

This application is a continuation of U.S. patent application Ser. No. 15/428,677 filed on Feb. 9, 2017 which claims the benefit under 35 USC § 119(a) of Korean Patent Application No. 10-2016-0017671 filed on Feb. 16, 2016 and Korean Patent Application No. 10-2016-0124008 filed on Sep. 27, 2016, in the Korean Intellectual Property Office, the entire disclosure of which is incorporated herein by reference for all purposes.

BACKGROUND

1. Field

The following description relates to a key generating method and apparatus, and more particularly, to a method and apparatus to generate a key indicating a characteristic of an apparatus.

2. Description of Related Art

A unique identifier (ID) may be assigned to an apparatus or hardware. When a unique ID is randomly assigned to an apparatus, the unique ID is copied or changed. For example, a universal subscriber identity module (USIM) of a mobile phone includes member identification information. The member identification information is copied and used by a user who is not a legitimate user. For example, a media access control address is set to be a unique address for an apparatus, but may be changed by software.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a key generating method includes obtaining a first error correcting code (ECC) for original data, obtaining read data from a cell array of a memory comprising the original data, generating a second ECC for the read data, obtaining a location of a cell in which an error occurs from the cell array of the memory in response to the second ECC being different from the first ECC, and generating a key for the memory based on the location of the cell in which the error occurs.

The original data may be randomly generated data.

The memory may be a NAND flash memory.

The obtaining of the first ECC may comprise reading the first ECC written, using an adjusted write voltage, in a preset area of the cell array based on a single level cell (SLC) scheme.

The obtaining of the read data may comprise obtaining the read data by reading the original data written in a preset area of the cell array based on a multi level cell (MLC) scheme.

The error may be a hard error, a soft error, or both.

The obtaining of the location may comprise indicating the location of the cell by two-dimensional (2D) coordinates. The 2D coordinates may be dimensional information of a page number of the cell array and dimensional information of a bit number or a byte number of the page number.

The obtaining of the location may comprise obtaining the location of the cell in which the error occurs based on a block unit of the cell array.

The generating of the key may be based on a location of a cell satisfying a preset condition among locations of cells determined by repeatedly performing the obtaining of the read data, the generating of the second ECC, and the obtaining of the location of the cell in which the error occurs.

The generating of the key may comprise converting 2D coordinates of the cell to a one-dimensional value in response to the location of the cell being indicated by 2D coordinates.

In another general aspect, a non-transitory computer-readable medium stores instructions that, when executed by a processor, cause the processor to perform the method above.

In another general aspect, a key generating apparatus includes a memory comprising a cell array configured to store original data and a first error correcting code (ECC) for the original data, and a memory controller configured to obtain read data by reading the original data from the cell array and generate a second ECC for the read data, and a processor configured to obtain a location of a cell in which an error occurs from the cell array in response to the second ECC being different from the first ECC, and generate a key for the memory based on the location of the cell in which the error occurs.

In another general aspect, a terminal authenticating method includes obtaining read data by reading data from a predetermined area of a memory, generating a first key based on an error correcting code (ECC) for the read data, comparing the first key to a pre-stored second key, and authenticating a terminal in response to a determination that the first key and the second key are generated from an identical memory.

The determination that the first key and the second key are generated from identical memory may comprise determining that the first key and the second key are substantially identical. The first key and the second key may be substantially identical in response to a difference between the ECC of the first key and a second ECC of the second key being below a predetermined threshold.

The generating of the first key may be performed in a security area of a processor. The second key may be stored in the security area of the processor.

The method may further include generating the ECC based on read data sets generated by reading the data a number of times. The generating of the ECC based on the read data sets may include determining the read data based on the read data sets, and generating the ECC for the determined read data.

The memory may be a NAND flash memory.

In another general aspect, a non-transitory computer-readable storage medium stores instructions that, when executed by a processor, cause the processor to perform the method above.

Other features and aspects will be apparent from the following detailed description, the drawings, and the claims.

Figure 1:
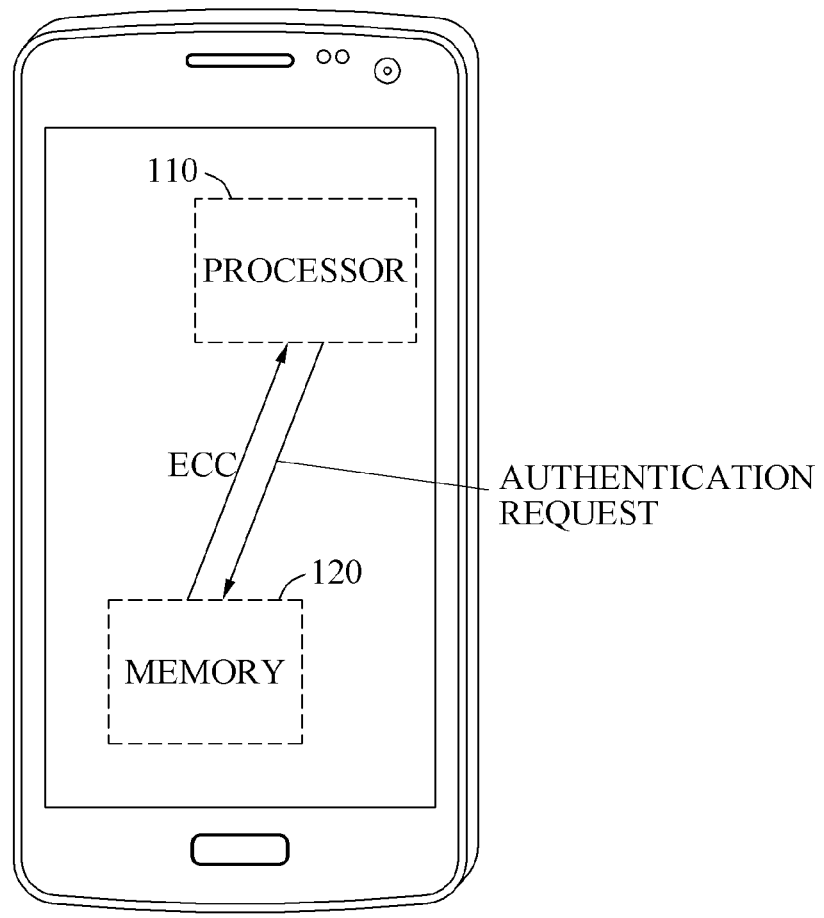
FIG. 1 is a diagram illustrating an example of a terminal authenticating method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, the examples will be described with reference to the accompanying drawings. Like reference numerals refer to like elements throughout.

The features of the examples described herein may be combined in various ways as will be apparent after an understanding of the disclosure of this application. Further, although the examples described herein have a variety of configurations, other configurations are possible as will be apparent after an understanding of the disclosure of this application.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a diagram illustrating an example of a terminal authenticating method.

A method of verifying a unique characteristic of a terminal is used as the method of authenticating a user. In more detail, a method of authenticating a terminal of a user. The unique characteristic of the terminal is a physical characteristic of the terminal to be authenticated. For example, the unique characteristic may be a physical characteristic of a memory included in the terminal. The memory includes cells storing data, and a location of a cell in which an error occurs among the included cells may be the unique characteristic of the memory.

For example, a terminal 100 to be authenticated includes a processor 110 and a memory 120. The processor 110 transmits an authentication request to the memory 120. The memory 120 receiving the authentication request transmits, to the processor 110, information on the unique characteristic of the memory 120. For example, the information on the unique characteristic may be an error correcting code (ECC). The processor 110 determines whether the terminal 100 is an original terminal or a copied terminal based on information of the memory 120. In response to the terminal 100 being the original terminal, the processor 110 authenticates the terminal 100. In response to the terminal 100 being the original terminal, data to be transmitted is encoded such that network hacking is not possible.

Figure 2:
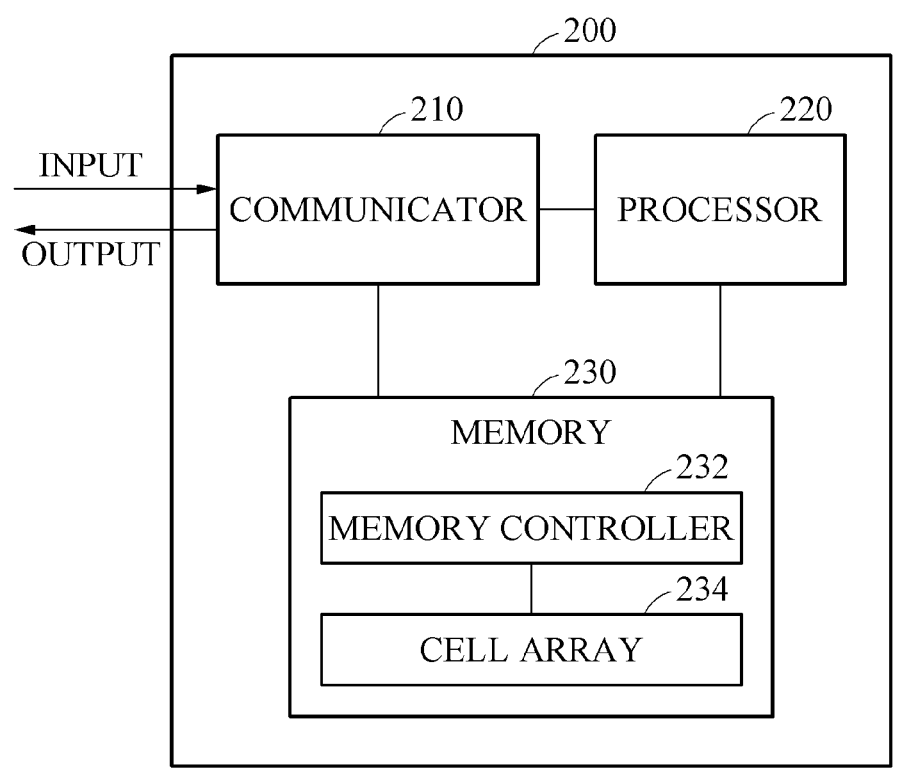
FIG. 2 is a block diagram illustrating an example of a key generating apparatus.

FIG. 2 is a block diagram illustrating an example of an apparatus for generating a key.

A key for authenticating a terminal based on an error correcting code (ECC) generated from a memory is generated and the terminal is authenticated based on the generated key.

A key generating apparatus 200 includes a communicator 210, a processor 220, and a memory 230. The communicator 210 exchanges data or information with an outside apparatus. The processor 220 is a hardware processor. The processor 220 processes data received by the communicator 210 and data stored in the memory 230. The memory 230 includes a memory controller 232 and a cell array 234. The memory controller 232 controls the cell array 234 and writes the data in the cell array 234. The cell array 234 includes a plurality of cells, and the data may be written in each of the cells. The memory 230 may be a flash memory. For example, the flash memory may be a NAND flash memory.

The communicator 210, the processor 220, and the memory 230 will be described in greater detail with reference to FIGS. 3 through 14.

A Method of Writing an Original Data and an Error Correcting Code (ECC)

Figure 3:
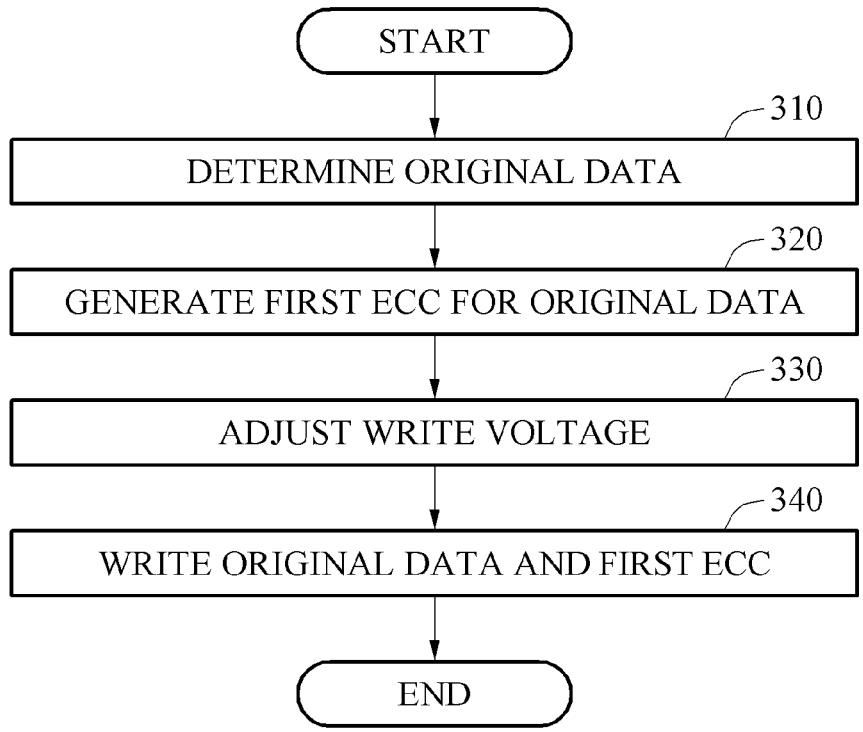
FIG. 3 is a flowchart illustrating an example of a method of writing original data and a first error correcting code (ECC).

FIG. 3 is a flowchart illustrating an example of a method of writing original data and a first error correcting code (ECC).

Before a key for authenticating a terminal is generated, original data used for generating the key and an ECC for the original data is pre-generated. For example, operations 310 through 340 are performed in a process of producing the key generating apparatus 200 or the memory 230. Operations 310 through 340 may be performed by the processor 230 or an apparatus for producing the memory 230.

In operation 310, the original data is determined. In an example, the original data is randomly generated. In another example, the original data is data associated with an operation system or firmware of which data is not changed after the data is written, unless a particular event such as system initialization occurs. In another example, original data is generated based on a function. In such case where the original data is parametric, a parameter of the original data is stored.

In operation 320, the ECC for the original data is generated. The ECC for the original data is referred to as a first ECC.

In operation 330, a threshold reference voltage or a voltage distribution width used for writing the data is adjusted. For example, when the original data is written based on a single level cell (SLC) scheme, in a cell in which the data is written based on a triple level cell (TLC) scheme, a write voltage of the data is intentionally adjusted in order to cause a data write error. As the write voltage is adjusted, the average value of the voltage distribution is changed accordingly. Also, a range of a write error distribution may be adjusted. A method of adjusting the write voltage of the data will be described below with reference to FIG. 4.

In an example, the write voltage for writing the first ECC is not adjusted.

In operation 340, the original data and the first ECC are written in the memory 230. In an example, the original data and the first ECC are written in each preset areas of the cell array 234. In another example, the original data and the first ECC are written in each preset areas of the processor 230. The preset areas of the cell array 234 and the processor 230 are areas inaccessible to a user.

In an example, in response to the original data and the first ECC being pre-written data, operation 340 may not be performed.

In an example, the original data and the first ECC are written based on any one of the SLC scheme, the TLC scheme, or a multilevel cell (MLC) scheme. A scheme for writing the original data may differ from a scheme for writing the first ECC. For example, the original data may be written based on the MLC scheme using the adjusted write voltage, and the first ECC may be written based on the SLC scheme. The first ECC is written in order that a read error does not occur when the first ECC is read.

Figure 4:
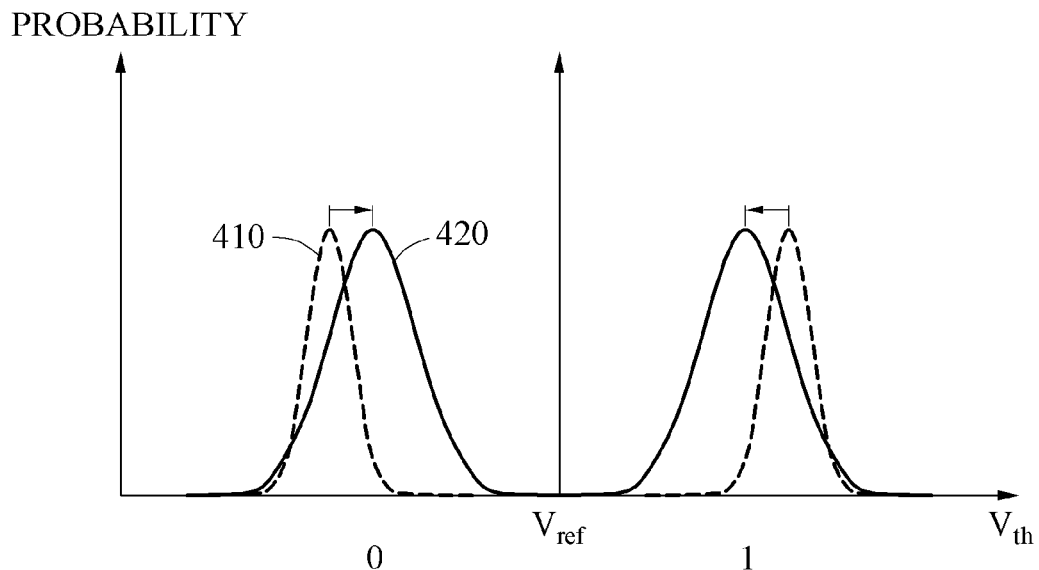
FIG. 4 is a graph illustrating an example of a method of adjusting a threshold voltage distribution.

FIG. 4 is a graph illustrating an example of a method of adjusting a threshold voltage distribution.

Data may be read based on an amount of a voltage stored in a cell. For example, a bit, for example, 0 or 1, of written data may be determined based on a threshold reference voltage $V_{ref}$ in a single level cell (SLC) scheme.

In response to a first error correcting code (ECC) being written based on the SLC scheme in a cell in which the data is written based on a triple level cell (TLC) scheme, a probability of reading the data near the threshold reference voltage $V_{ref}$ may be small since, in such a case, a distance between peaks of a voltage distribution used to store the data is increased. In response to a read error not occurring when the data is read, a unique characteristic of the memory 230 may not be present.

For example, a first voltage distribution 410 indicates a write voltage distribution before the write voltage distribution is adjusted. The write voltage distribution of the first voltage distribution 410 is not formed near the threshold reference voltage $V_{ref}$.

A second voltage distribution 420 is an adjusted write voltage distribution. In an example, the second voltage distribution 420 is a voltage distribution obtained by adjusting a voltage distribution peak of the first voltage distribution 410 to be closer to the threshold reference voltage $V_{ref}$. In another example, the second voltage distribution 420 is a voltage distribution obtained by adjusting a width of the first voltage distribution 410. Therefore, the probability of reading the data near threshold reference voltage $V_{ref}$ may be increased by adjusting the write voltage distribution.

Figure 5:
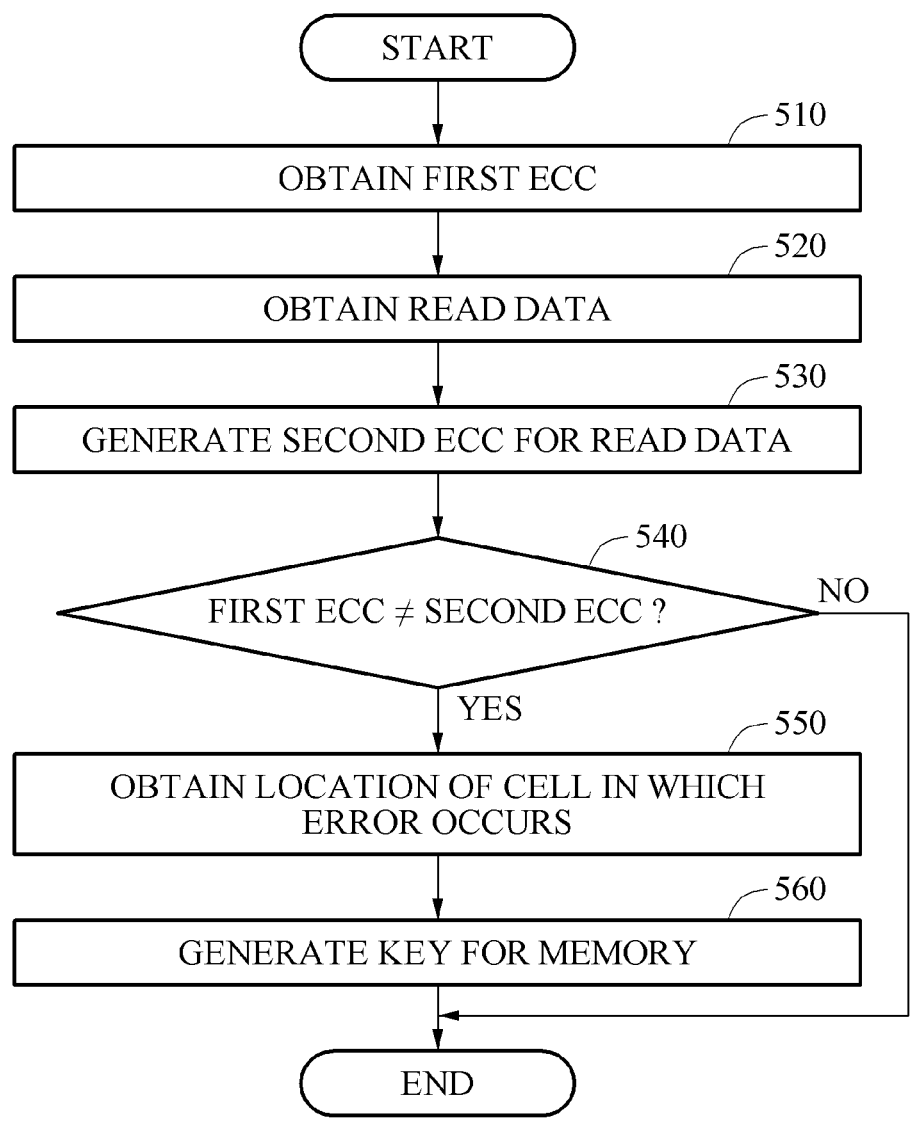
FIG. 5 is a flowchart illustrating an example of a key generating method.

FIG. 5 is a flowchart illustrating an example of a key generating method.

The key generating method include operations 510 through 560. Operation 510 may be performed after operation 340 is performed.

In operation 510, the processor 220 obtains a first error correcting code (ECC). In an example, a first ECC written in a predetermined area of a cell array is obtained. In another example, a first ECC written in a predetermined area of the processor 220 is obtained. The processor 220 reads the first ECC written, using an adjusted write voltage, in a preset area of the cell array based on a single level cell (SLC) scheme.

In operation 520, the memory controller 232 obtains read data. For example, the memory controller 232 obtains the read data from the cell array 234 in which the original data is written.

In operation 530, a second ECC for the obtained read data is generated.

In an example, the memory controller 232 generates the second ECC for the obtained read data. The generated second ECC is transmitted to the processor 220. For example, the second ECC for the read data is generated based on a block unit of the cell array.

In an example, the memory controller 232 transmits the obtained read data to the processor 220, and the processor 220 generates the second ECC for the read data. Concisely, a processing apparatus having data processing ability generates the second ECC for the read data.

In operation 540, the processor 220 determines whether the generated second ECC is considered to be substantially identical to the first ECC. The second ECC may not fully reflect recorded data due to a read error. Based on the read error, the first ECC and the second ECC may be considered to be substantially identical when they are within a preset range. For example, a difference between the first ECC and the second ECC may be calculated using a Hamming distance or a Euclidean distance, and when the calculated distance is less than or equal to a threshold value, the first ECC and the second ECC may be considered to be substantially identical. Hereinafter, an expression that "A" and "B" are substantially identical indicates that a difference between "A" and "B" is within a range of a threshold. For example, the threshold may be predetermined.

When the original data and the read data are substantially identical, the first ECC and the second ECC are also substantially identical. When the original data and the read data are not substantially identical, the first ECC and the second ECC are not substantially identical.

A reason that the original data and the read data are not substantially identical may be at least one of 1) a cell in which the original data is written is a bad cell, and 2) an error occurs when the data is written using a voltage. An error caused by the bad cell may be a hard error, and an error caused by writing the data may be a soft error.

In response to the first ECC and the second ECC being substantially identical, a unique characteristic of the memory 230 may not appear and thus, a key may not be generated. The bad cell may be the unique characteristic of the memory 230 since the bad cell unpredictably and randomly occurs when the memory 230 is manufactured or produced. Even though the soft error is not a natively unique characteristic of the memory 230, the soft error is a semi-unique characteristic of the memory 230 since the error that occurs when the data is written is maintained until the data is written again.

In operation 550, the processor 220 obtains a location of a cell in which an error occurs based on the first ECC and the second ECC. Since the first ECC is accurate data, the location of the cell in which the error occurs is determined based on a difference between the first ECC and the second ECC. The processor 220 determines the location of the cell in which the error occurs based on the block unit of the cell array.

For example, the location of the cell in which the error occurs may be indicated by two-dimensional (2D) coordinates. Detailed descriptions of the location of the cell indicated by 2D coordinates will be provided below with reference to FIG. 7.

In operation 560, the processor 220 generates a key for the memory 230 based on the location of the cell in which the error occurs. For example, the key may be generated by converting 2D coordinates of the cell to a one-dimensional value in response to the location of the cell being indicated by 2D coordinates. In response to a locality sensitive hashing (LSH) being used to perform dimension reduction on 2D data to convert the 2D data to one-dimensional data, the error can be corrected even when the location of the cell in which the error is detected and a location of a cell in which an actual error occurs are not accurate. The error may be caused by read disturbance. The generated key may be a hash value. In another example, the 2D coordinates may be associated with a key for the memory 230. The 2D coordinates of the location of the cell in which the error occurs is referred to as a key pattern.

Figure 6:
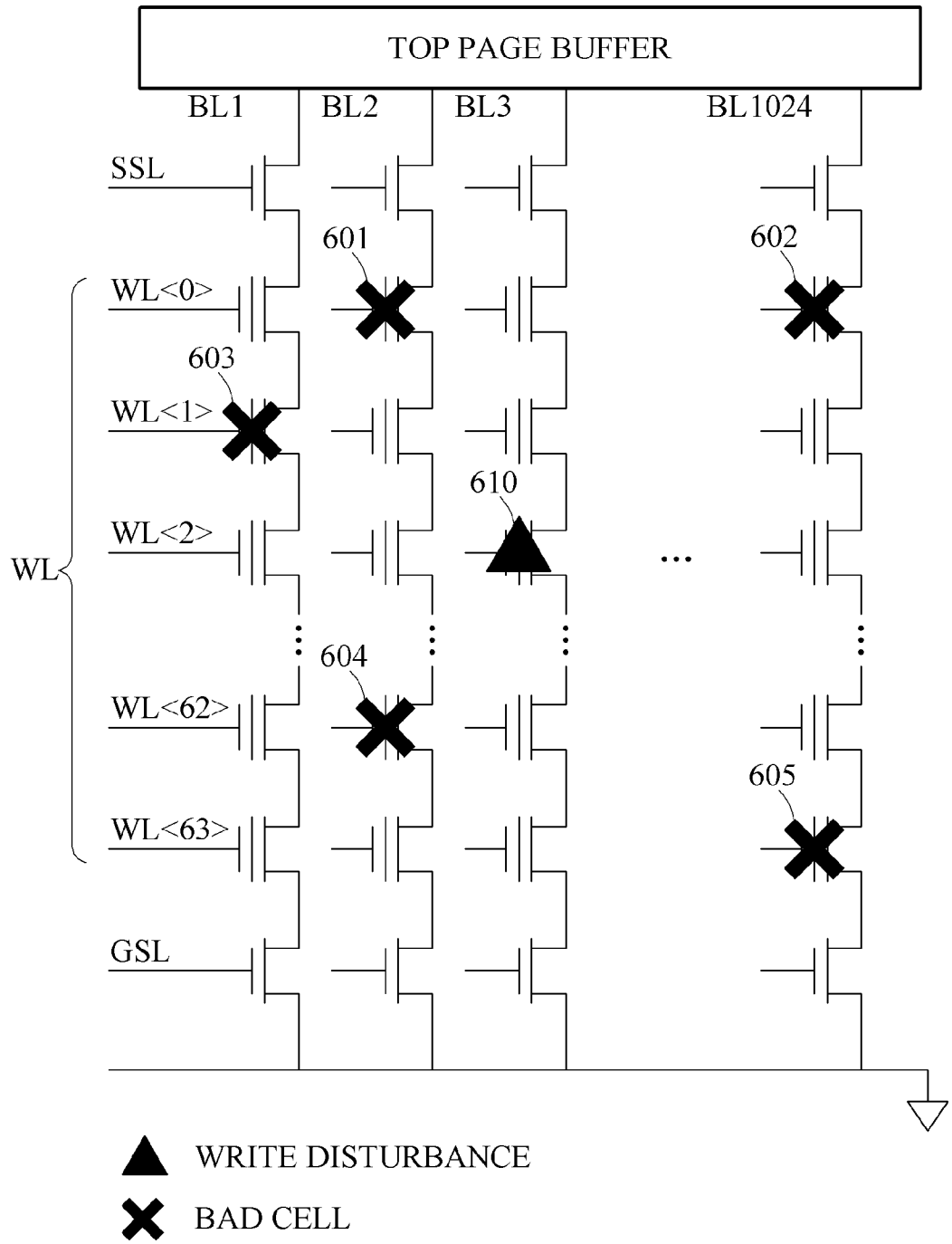
FIG. 6 is a diagram illustrating an example of a cell array including a cell in which an error occurs.

FIG. 6 is a diagram illustrating an example of a cell array including a cell in which an error occurs. The cell array of FIG. 6 may be one of a plurality of cell arrays included in the memory 230. For example, the cell array may be one block.

The processor 220 obtains a location of a cell in which an error occurs based on a difference between a first error correcting code (ECC) and a second ECC. For example, cells 601 through 605 are bad cells, a cell 610 is a cell in which an error occurs due to a write disturbance. An error may be caused by a bad cell and write disturbance. The locations of the bad cells are represented by the difference between the first ECC and the second ECC.

Figure 7:
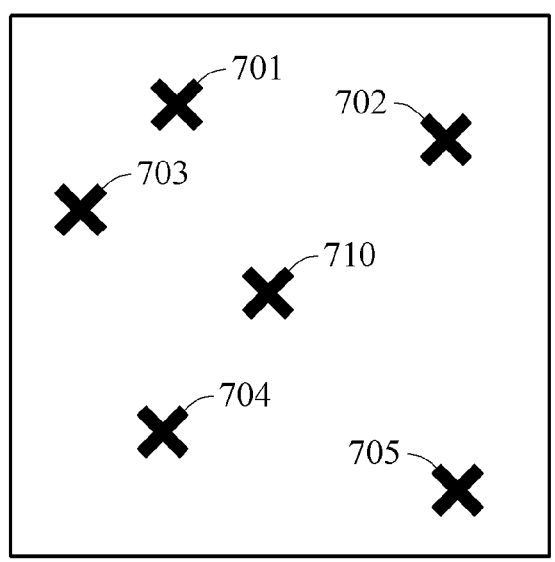
FIG. 7 is a diagram illustrating an example of two-dimensional (2D) coordinates indicating a location of a cell in which an error occurs.

FIG. 7 is a diagram illustrating an example of two-dimensional (2D) coordinates indicating locations of cells in which an error occurs.

Two-dimensional (2D) coordinates are dimensional information of a page number of a cell array and dimensional information of a bit number or a byte number of the page number. For example, an x-axis of the second coordinates indicates the page number, and a y-axis indicates the bit number or the byte number. However, embodiments are not limited thereto and the x-axis may indicate the bit number or the byte number and the y-axis may indicate the page number.

Points 701 through 705 in a 2D plane 700 correspond to the bad cells 601 through 605 of cell array of a memory illustrated in FIG. 6. Point 710 corresponds to the cell 610 in which the error occurs due to write disturbance. A key may be generated based on the unique locations of bad cells 701 through 705 in cell array of the memory.

Figure 8:
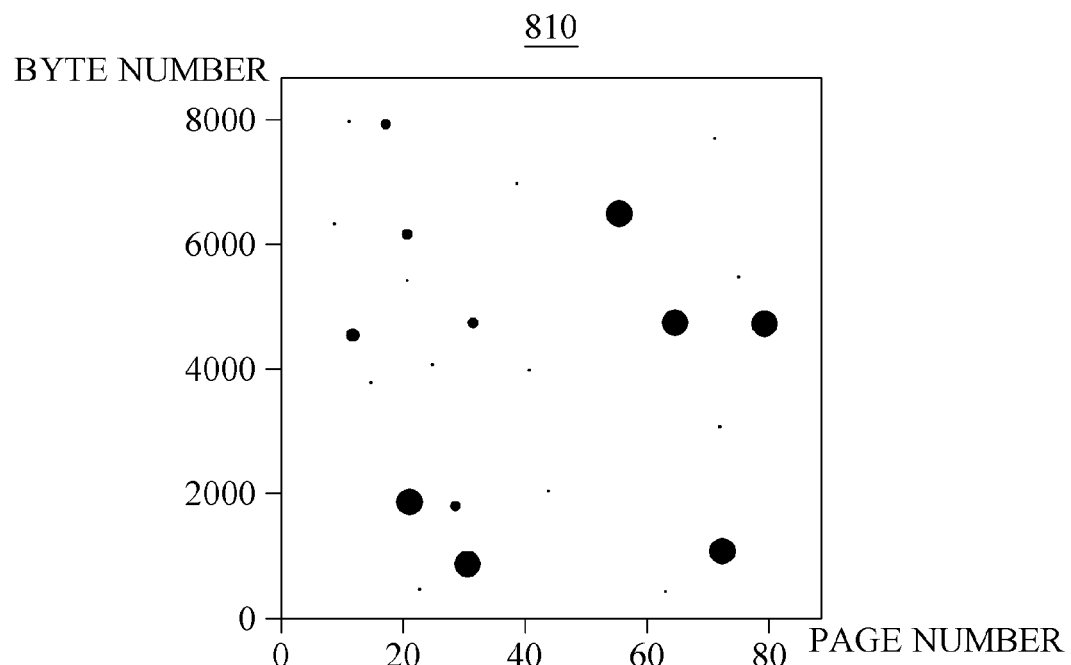
FIG. 8 is a diagram illustrating an example of a key generating method.
Figure 8:
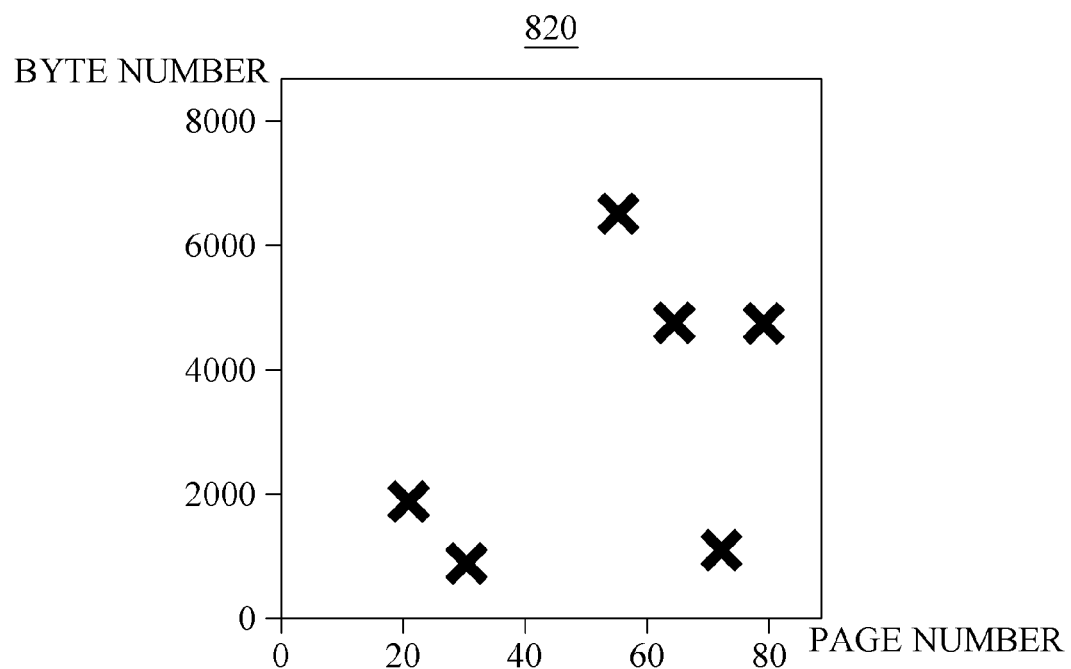

FIG. 8 is a diagram illustrating an example of a key generating method.

In an example, operation 520 of obtaining the read data, operation 530 of generating the second ECC, and operation 550 of obtaining the location of the cell in which the error occurs is performed a plurality of times. Operations 520 through 550 are performed a plurality of times and thus, a plurality of read data sets are generated. For example, 50 read data sets may be generated.

A graph 810 indicating locations of cells in which errors occur is obtained using the data sets based on two-dimensional (2D) coordinates. The graph 810 is obtained or generated by accumulating numbers of obtained or determined locations of cells in which errors occur. As the accumulated numbers increase, the sizes of the points representing the cells increase, respectively. Thus, as the second ECC is repeatedly generated from the plurality of read data sets and as each location of each cell in which an error is repeatedly registered, the size of the points on the graph 810 representing the respective cells increases proportionally. Therefore, the size of each point on the graph 810 corresponds to the number of times each location of each cell registers as having an error when repeatedly generating the second ECC from the plurality of data sets. Based on the second ECC from the data sets, the location of a bad cell in which an error occurs is finally determined when the number of registered errors for the cell satisfies a preset condition. For example, the preset condition may be a predetermined threshold, or number of times an error occurs in a row. As an example, the preset condition may be a predetermined number of successive errors being registered in the data set. Therefore, by repeatedly generating the second ECC from the data sets, an error due to a bad cell can be distinguished from an error due to a write disturbance of a normal cell.

In an example, because a position of a cell in which an error occurs indicates a feature of a memory, the position of the cell in which the error occurs may be visually or graphically output for a visualization or display purpose. For example, the cell in which the error occurs may be exaggeratedly expressed in comparison to a normal cell.

By generating the data sets, a number of errors caused by a read disturbance randomly occurring when the data is read may be reduced and disregarded for the purposes of generating a key.

A Terminal Authenticating Method

A method of authenticating a terminal based on a key generated using an error correcting code (ECC) for a memory will be described with reference to FIGS. 9 through 12.

A method of authenticating the terminal 200 may be used to perform authentication by the terminal 200. For example, the method of authenticating the terminal 200 may be utilized when an internet-based financial service is used through the terminal 200. The processor 220 generates a key for the memory 230 in an enrollment process, and write the generated key in a security area. For example, the security area may be a trusted zone of the processor such as a Trusted Execution Environment (TEE) or an ARM Trust Zone. Subsequent to the enrollment process, the key for the memory 230 is generated to authenticate the terminal 200, and whether the generated key is substantially identical to a key written in the security area is determined. In response to the generated key being substantially identical to the key written in the security area, the terminal 200 is determined to be authenticated.

Figure 9:
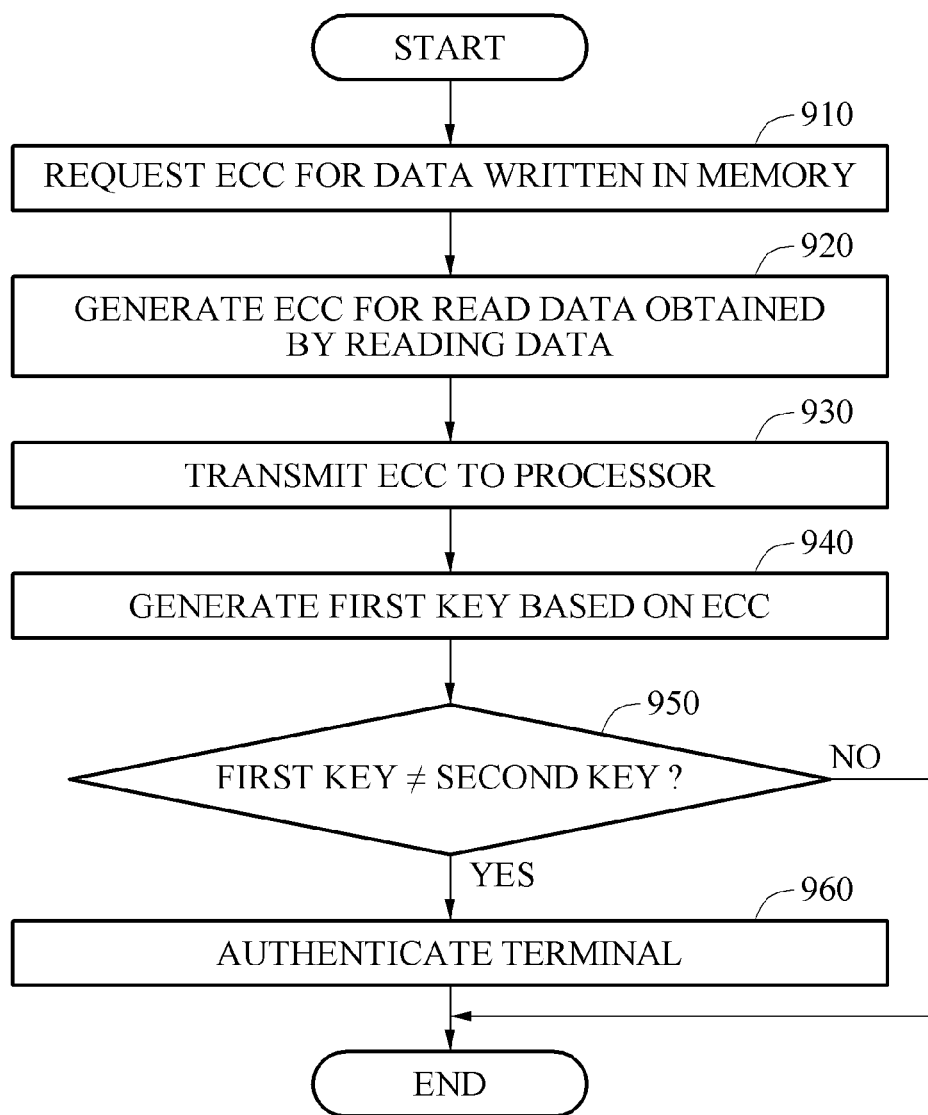
FIG. 9 is a flowchart illustrating an example of a terminal authenticating method.

FIG. 9 is a flowchart illustrating another example of a terminal authenticating method.

Before operation 910 is performed, the processor 220 receives a terminal authentication request. In an example, the terminal authentication request is received from an outside apparatus. In another example, the terminal authentication request is received in a process of booting a terminal.

In operation 910, the processor 220 sends a request to the memory 230, for an error correcting code (ECC) for data written in the memory 230. The written data may be aforementioned original data, and the ECC may be an ECC for read data generated by reading the original data. The ECC for the read data may be an aforementioned second ECC. The original data is written in a predetermined area of the memory 230.

In operation 920, the memory controller 232 obtains the read data by reading the original data written in the cell array 234. The memory controller 232 generates the ECC for the read data. In an example, the memory controller 232 transmits the read data to the processor 220, and the processor 220 generates the ECC for the read data.

In operation 930, the memory controller 232 transmits the generated ECC to the processor 220. In an example, in response to the memory controller 232 transmitting the read data to the processor 220 in operation 920, operation 930 is not performed and the processor generates the ECC for the read data.

In operation 940, the processor 220 generates a first key based on the ECC. For example, the first key is generated in a security area of the processor 220.

In an example, the processor 220 obtains a first ECC for the original data, compares the obtained first ECC to the ECC received from the memory controller 232, and generates the first key based on a difference between the first ECC and the received ECC. Repeated descriptions will be omitted for increased clarity and conciseness because the above descriptions of operations 550 and 560 are representative of operations 950 and 960, respectively, for generating the first key using the first ECC.

In another example, the processor 220 generates the first key using the received ECC. For example, the generated ECC may be the first key.

In operation 950, the processor 220 determines whether the generated first key is considered to be substantially identical to a second key. Concisely, the processor 220 determine whether the first key and the second key are generated from an identical memory.

The second key may be a key pre-obtained by the processor 220. The second key is used to verify integrity and authenticity of the first key. The second key is generated when the terminal 200 is produced, and is pre-written in the preset area of the memory 230 or the security area of the processor 220. The second key is data to which a unique characteristic of the memory 230 is reflected. For example, the second key is a key generated based on the unique characteristic of the memory 230 described with reference to FIGS. 2 through 8. In response to a determination that the first key and the second key are substantially identical, a hash value is generated using the second key instead of the first key.

In an example, whether the first key converted to a one-dimensional value and the second key are substantially identical is determined. In another example, whether a pattern of the first key and a pattern of the second key are substantially identical is determined.

In response to a degree of similarity between the first key and the second key being within a preset threshold value, the first key and the second key are determined to be substantially identical. In response to the first key and the second key being key patterns, the degree of similarity between the first key and the second key may be calculated using a distance, an angle of a coordinate plane of a cell indicated by an original point, and a registered error.

In operation 960, the processor 220 authenticates the terminal 200 in response to the first key and the second key being substantially identical.

Figure 10:
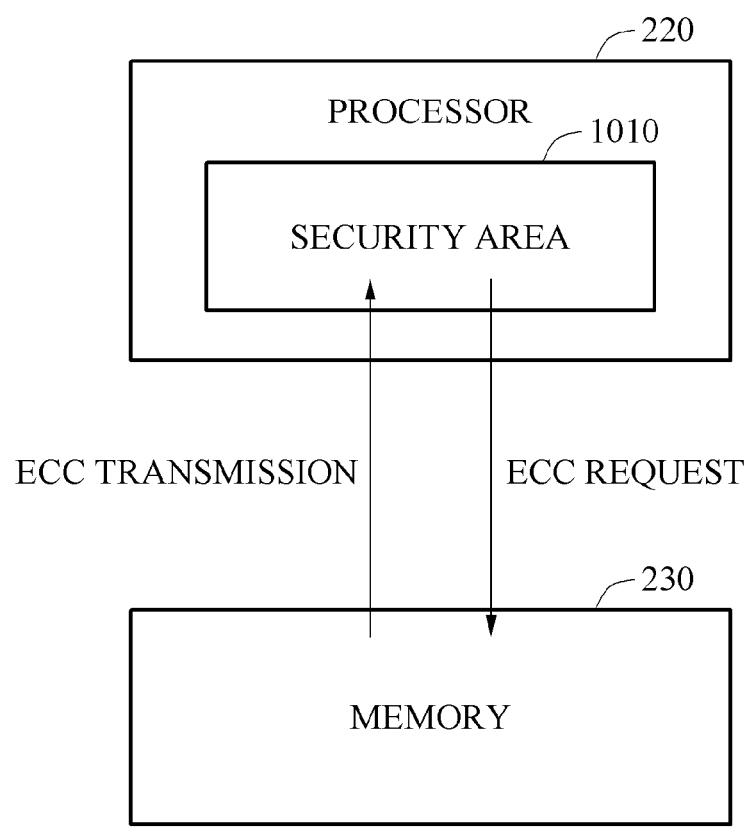
FIG. 10 is a diagram illustrating an example of a terminal authenticating method using a security area.

FIG. 10 is a diagram illustrating an example of a terminal authenticating method using a security area.

The processor 220 includes a security area 1010. For example, the security area 1010 may be an ARM Trust Zone. The processor 220 includes a general area and a security area. A general program is processed in the general area and a program requiring security is processed in the security area.

The processor 220 sends a request for an error correcting code (ECC) to the memory 230 through the security area 1010. The memory 230 transmits the ECC to the security area 1010. The processor 220 generates a first key based on the received ECC from the security area 1010 and determines whether the first key and a second key are substantially identical.

Figure 11:
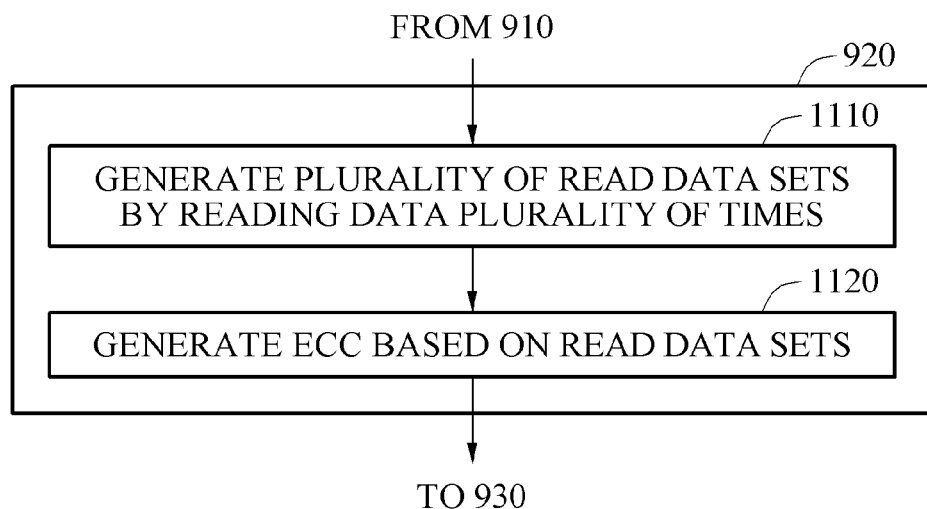
FIG. 11 is a flowchart illustrating an example of a method of generating an error correcting code (ECC) for read data.

FIG. 11 is a flowchart illustrating an example of a method of generating an error correcting code (ECC) for read data. Operations 1110 and 1120 may be representative of operation 920, however, embodiments are not limited thereto.

In operation 1110, the memory controller 232 generates a plurality of read data sets by reading written original data a plurality of times. In operation 1120, the memory controller 232 generates an error correcting code (ECC) based on the read data sets. Detailed description of a method of generating the ECC based on the read data sets will be provided with reference to FIG. 12.

Figure 12:
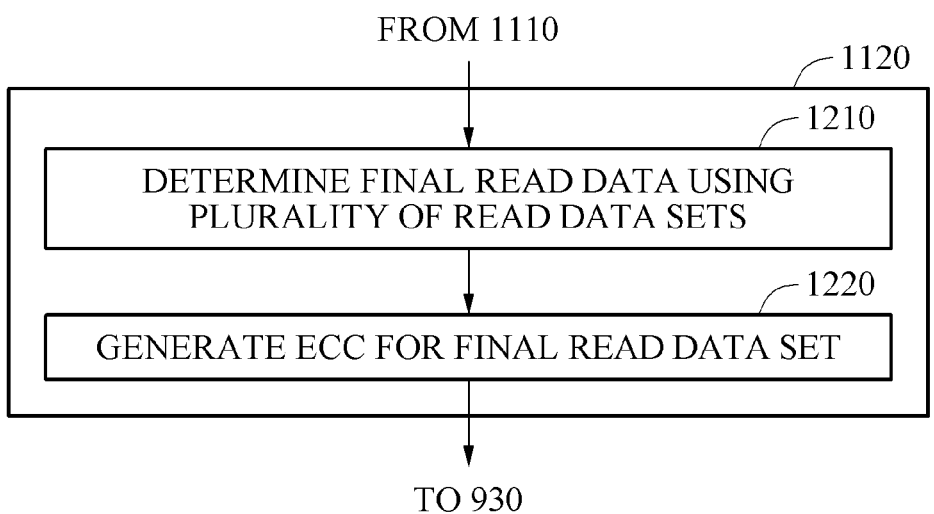
FIG. 12 is a flowchart illustrating an example of a method of generating an error correcting code (ECC) based on a plurality of read data sets.

FIG. 12 is a flowchart illustrating an example of a method of generating an error correcting code (ECC) based on a plurality of read data sets. Operations 1210 and 1220 may be representative of operation 1120, however, embodiments are not limited thereto.

In operation 1210, the memory controller 232 determines final read data using a plurality of read data sets. A bit detected a number of times greater than or equal to a predetermined number may be included in the final read data. For example, a bit detected a greatest number of times among the bits of read data sets is determined at each position of a final read data set. For example, a bit 0 may be detected twice at a fifth position of the read data, and a bit 1 may be determined to be at the fifth position of the final read data in response to the bit 1 being detected 48 times. By generating the read data sets, a number of errors caused by read disturbance may be reduced and a bad cell location may be determined.

In operation 1220, the memory controller 232 generates an error correcting code (ECC) for the final read data set.

A Terminal Booting Method

Figure 13:
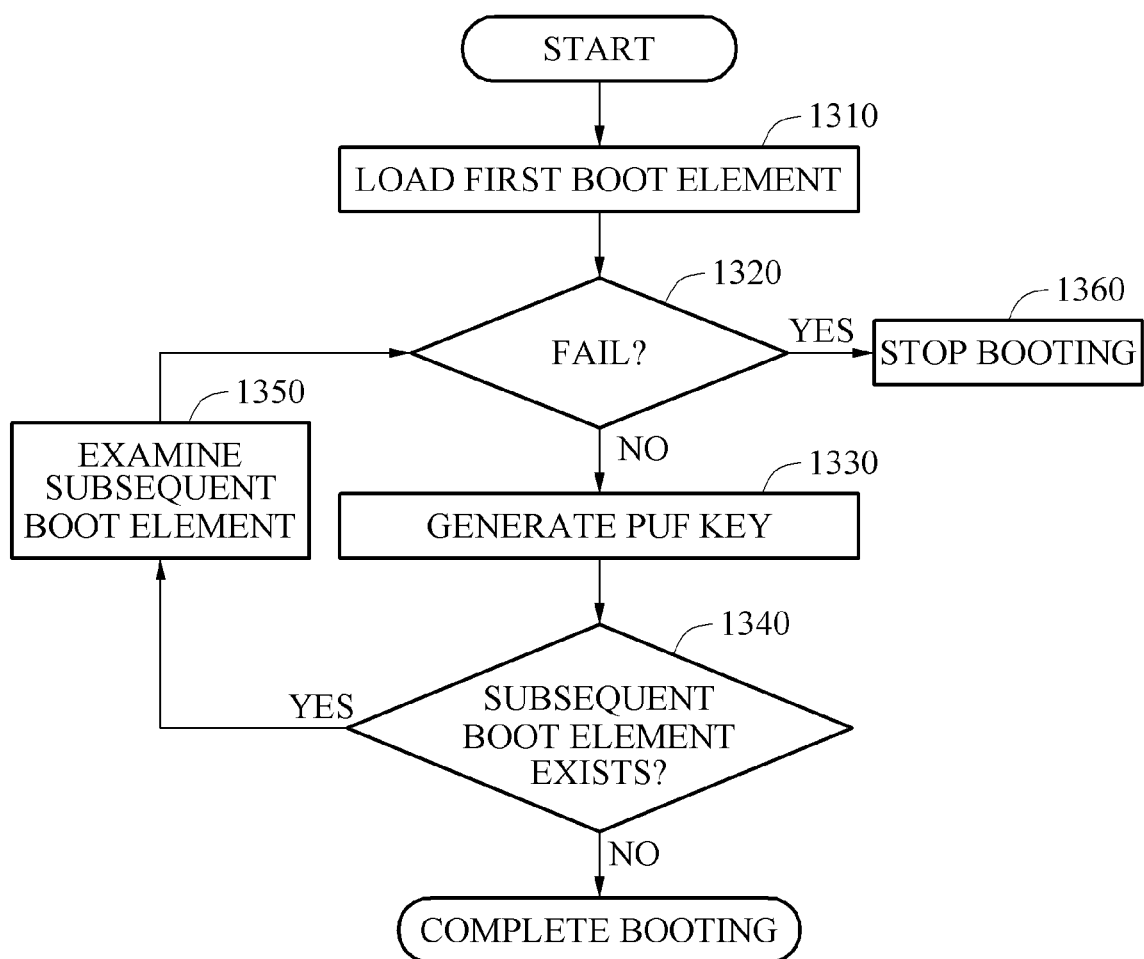
FIG. 13 is a flowchart illustrating an example of a method of booting a terminal.

FIG. 13 is a flowchart illustrating an example of a method of booting a terminal.

In operation 1310, the processor 220 loads a first boot element. Since the first boot element is written in a read-only memory (ROM), the first boot element may be integrated with the processor.

In an example, in response to the first boot element booting successfully, operation 1320 may not be performed and operation 1330 may be performed. In another example, in response to the first boot element booting successfully, the processor 220 may determine that an examination of a subsequent boot element is successful in operation 1320.

In operation 1330, in response to the first boot element booting successfully, the processor 220 generates a physically unclonable function (PUF) key using the memory 230. For example, the processor 220 generates the PUF key for a predetermined area of the cell array 234 of the memory 230 associated with the first boot element. For example, the PUF key is generated based on an error correcting code (ECC) for written data. The written data may be written based on the first boot element. In an example, the PUF key may be the ECC. In another example, the PUF key may correspond to the first key described with reference to FIG. 9, however embodiments are not limited thereto.

In operation 1340, the processor 220 determines whether the subsequent boot element exists.

In operation 1350, the processor 220 examines the subsequent boot element.

In an example, a first unique characteristic of the subsequent boot element of original data is extracted in advance, and the first unique characteristic is decoded in advance using the PUF key. In operation 1340, the processor 220 decodes the encoded first unique characteristic using the PUF key generated in a previous operation. The processor 220 extracts a second unique characteristic of the subsequent boot element to be processed, and examines whether the second unique characteristic is substantially identical to the first unique characteristic.

In an example, the subsequent boot element is written in an area of the cell array 234 in which data in the cell array 234 is changeable. In response to a boot element being changed due to an outside event, the extracted second unique characteristic may differ from the first unique characteristic. In response to the second unique characteristic differing from the first unique characteristic, i.e., a comparison of the first and second unique characteristics is considered a fail, the boot element is considered to be dishonest, unsecure, and/or hacked. Therefore, the processor will stop booting or will not load the boot element. The processor 220 performs subsequent booting using the subsequent boot element in response to the second unique characteristic being substantially identical to the first unique characteristic.

In operation 1320, the processor 220 determines whether the next booting fails or succeeds. In response to the next booting failing, operation 1360 is performed, wherein the boot element stops booting. In response to the subsequent booting succeeding, operations 1330 through 1350 are iteratively performed. In response to the subsequent boot element not existing, booting may be completed.

A File Decoding Method

Figure 14:
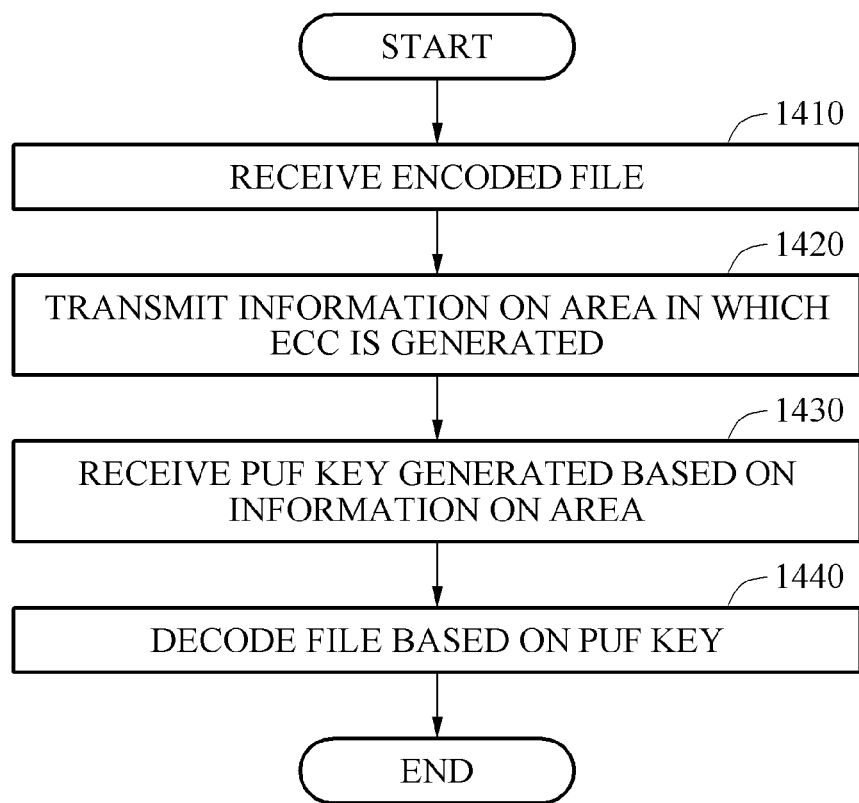
FIG. 14 is a flowchart illustrating an example of a method of decoding an encoded file.

FIG. 14 is a flowchart illustrating an example of a method of decoding an encoded file.

In operation 1410, the processor 220 receives an encoded file. For example, the encoded file may be received in a security area of the processor 220.

In operation 1420, the processor 220 transmits, to the memory 230, information on a predetermined area of the memory 230. The information on the predetermined area includes coordinates of the cell array 234. The predetermined area may be a portion of the memory 230, and there may be a plurality of predetermined areas within the memory.

In operation 1430, the processor 220 receives a physically unclonable function (PUF) key for the predetermined area. The PUF key is generated by the memory controller 232. For example, each PUF key for each of predetermined areas of the memory 230 may be stored in a table form. The predetermined area and the PUF key may be matched and stored in a table form. The table may be pre-stored in the security area. Different predetermined areas may be used to create different PUF keys.

For example, the memory controller 232 generates an error correcting code (ECC) for data written in the predetermined area. The memory controller 232 performs hash functions on the ECC using a hash function. The memory controller 232 generates the PUF key based on the hashed ECC, and transmits the generated PUF key to the processor 220.

In operation 1440, the processor 220 decodes an encoded file based on the received PUF key. For example, the processor 220 determines whether the received PUF key is substantially identical to the PUF key pre-stored in the predetermined area, and decodes the encoded file using the pre-stored key in response to the received key being substantially identical to the pre-stored PUF key. For example, in response to a degree of similarity between the received PUF key and the pre-stored PUF key being within a range of a preset threshold value, the received PUF key and the pre-stored PUF key are determined to be substantially identical. In response to the file being decoded, the received PUF key may be deleted from the security area.

A method of encoding a file may be similarly performed through operations 1410 through 1440 above. The processor 220 transmits to the memory 230 the information on the predetermined area of the memory 230. The memory 230 generates the PUF key based on the information on the predetermined area. The processor 220 encodes the file based on the pre-stored PUF key.

The methods described in regards to FIGS. 3, 5, and 8-13 of this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3, 5, and 8-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As a non-exhaustive example only, a terminal as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

A terminal as described herein, which may be referred to as a computer terminal, may be an electronic or electromechanical hardware device that is used for entering data into and displaying data received from a host computer or a host computing system. A terminal may be limited to inputting and displaying data, or may also have the capability of processing data as well. A terminal with a significant local programmable data processing capability may be referred to as a smart terminal or fat client. A terminal that depends on the host computer or host computing system for its processing power may be referred to as a dumb terminal or thin client. A computer may run terminal emulator software that replicates the function of a terminal, sometimes allowing concurrent use of local programs and access to a distant terminal host system.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A key generating method comprising:
   obtaining read data by reading original data written in a preset area of a cell array of a memory;
   obtaining a location of a cell in which an error occurs from a cell array of the memory based on the original data and the obtained read data; and
   generating a key for the memory based on the location of the cell in which the error occurs.

2. The method of claim 1, wherein the original data is randomly generated data.

3. The method of claim 1, wherein the memory is a NAND flash memory.

4. The method of claim 1, wherein the obtaining of the read data comprises obtaining the read data by reading the original data written in the preset area of the cell array based on a multi level cell (MLC) scheme.

5. The method of claim 1, wherein the error is a hard error, a soft error, or both.

6. The method of claim 1, wherein the obtaining of the location comprises indicating the location of the cell by two-dimensional (2D) coordinates.

7. The method of claim 6, wherein the 2D coordinates are dimensional information of a page number of the cell array and dimensional information of a bit number or a byte number of the page number.

8. The method of claim 1, wherein the obtaining of the location comprises obtaining the location of the cell in which the error occurs based on a block unit of the cell array.

9. A non-transitory computer-readable medium storing instructions that, when executed by a processor, configure the processor to:
   obtain read data by reading original data written in a preset area of a cell array of a memory;
   obtain a location of a cell in which an error occurs from a cell array of the memory based on the original data and the obtained read data; and
   generate a key for the memory based on the location of the cell in which the error occurs.

10. A key generating apparatus comprising:
    a memory comprising a cell array configured to store original data, and a memory controller configured to obtain read data by reading the original data from the cell array; and
    a processor configured to
    obtain a location of a cell in which an error occurs from the cell array based on the original data and the read data, and
    generate a key for the memory based on the location of the cell in which the error occurs.

11. An apparatus comprising:
    a processor configured to,
    obtain read data by reading data from a predetermined area of a memory of the apparatus;
    generate a first key based on an error correcting code (ECC) for the read data;
    compare the first key to a pre-stored second key; and
    authenticate apparatus in response to a determination that the first key and the second key are generated from an identical memory.

12. The apparatus of claim 11, wherein the processor configured to determine that the first key and the second key are substantially identical.

13. The apparatus of claim 12, wherein the first key and the second key are substantially identical in response to a difference between the ECC of the first key and a second ECC of the second key being below a predetermined threshold.

14. The apparatus of claim 11, wherein the processor configured to generate the first key in a security area of the processor.

15. The apparatus of claim 14, wherein the second key is stored in the security area of the processor.

16. The apparatus of claim 14, wherein the processor further configured to:
    generate the ECC based on read data sets generated by reading the data a number of times.

17. The apparatus of claim 16, wherein the processor configured to determine the read data based on the read data sets, and generate the ECC for the determined read data.

* * * * *